United States Patent
Warnez et al.

(10) Patent No.: US 9,749,303 B2
(45) Date of Patent: Aug. 29, 2017

(54) METHOD FOR PERSONALIZING A SECURE ELEMENT, METHOD FOR ENABLING A SERVICE, SECURE ELEMENT AND COMPUTER PROGRAM PRODUCT

(71) Applicant: NXP B.V., Eindhoven (NL)

(72) Inventors: Dimitri Warnez, Hamburg (DE); Clemens Orthacker, Graz (AT)

(73) Assignee: NXP B.V., Eindhoven (NL)

( * ) Notice: Subject to any disclaimer, the term of this patent is extended or adjusted under 35 U.S.C. 154(b) by 263 days.

(21) Appl. No.: 14/182,519

(22) Filed: Feb. 18, 2014

(65) Prior Publication Data

US 2014/0245406 A1 Aug. 28, 2014

(30) Foreign Application Priority Data

Feb. 26, 2013 (EP) .................................... 13156748

(51) Int. Cl.
- *H04L 29/06* (2006.01)
- *G06F 21/77* (2013.01)
- *G06Q 20/32* (2012.01)
- *G06Q 20/34* (2012.01)

(52) U.S. Cl.
CPC .............. *H04L 63/06* (2013.01); *G06F 21/77* (2013.01); *G06Q 20/3227* (2013.01); *G06Q 20/3552* (2013.01); *G06F 2221/2115* (2013.01); *G06F 2221/2117* (2013.01)

(58) Field of Classification Search
CPC .. G06Q 20/32; G06Q 20/352; G06Q 20/3552; G06Q 30/0601; G06Q 20/40; G06Q 20/3672; G06Q 20/3227; G06Q 30/06; G06F 21/77; G06F 21/42; G06F 7/04; G06F 21/00; H04L 63/06; H04L 63/0815; H04W 12/04; H04W 12/06; H04W 36/0038
USPC ........ 726/5, 6, 7, 19; 705/26.1, 44; 707/758; 709/203; 455/410
See application file for complete search history.

(56) References Cited

U.S. PATENT DOCUMENTS

| | | | |
|---|---|---|---|
| 8,898,751 B2* | 11/2014 | Yin | G06F 21/42 455/410 |
| 2010/0044433 A1 | 2/2010 | Wankmueller et al. | |
| 2012/0130838 A1* | 5/2012 | Koh et al. | 705/26.1 |
| 2013/0007858 A1* | 1/2013 | Shah et al. | 726/6 |

OTHER PUBLICATIONS

Extended European Search Report for Application No. 13156748.9 Aug. 21, 2013.

* cited by examiner

*Primary Examiner* — Thanhnga B Truong

(57) ABSTRACT

According to an aspect of the invention, a method for personalizing a secure element for a mobile device is conceived, wherein an application is stored in the secure element and wherein the application is pre-provisioned by loading secure credentials into the application without tying said secure credentials to a specific user of the secure element.

8 Claims, 2 Drawing Sheets

METHOD FOR PERSONALIZING A SECURE ELEMENT, METHOD FOR ENABLING A SERVICE, SECURE ELEMENT AND COMPUTER PROGRAM PRODUCT

CROSS-REFERENCE TO RELATED APPLICATIONS

This application claims the priority under 35 U.S.C. §119 of European patent application no. 13156748.9, filed on Feb. 26, 2013, the contents of which are incorporated by reference herein.

FIELD OF THE INVENTION

The invention relates to a method for personalizing a secure element, a method for enabling a service, a secure element and a computer program product.

BACKGROUND OF THE INVENTION

US 2012/0130838 A1 describes a method for personalizing secure elements in mobile devices, which is incorporated herein by reference. Furthermore, US 2012/0130838 A1 contains, in the section "Background", a description of the background of the present disclosure, which is repeated herein for the sake of completeness.

Single functional cards have been successfully used in enclosed environments such as transportation systems. One example of such single functional cards is MIFARE that has been selected as the most successful contactless smart card technology. MIFARE is the perfect solution for applications like loyalty and vending cards, road tolling, city cards, access control and gaming.

However, single functional card applications are deployed in enclosed systems, which are difficult to be expanded into other areas such as e-commerce (electronic commerce) and m-commerce (mobile commerce) because stored values and transaction information are stored in data storage of each tag that is protected by a set of keys. The nature of the tag is that the keys need to be delivered to the card for authentication before any data can be accessed during a transaction. This constraint makes systems using such technology difficult to be expanded to an open environment such as the Internet for e-commerce and/or wireless networks for m-commerce as the delivery of keys over a public domain network causes security concerns.

In general, a smart card, chip card, or integrated circuit card (ICC), is any pocket-sized card with embedded integrated circuits. A smart card or microprocessor card contains volatile memory and microprocessor components. Smart cards may also provide strong security authentication for single sign-on (SSO) within large organizations. The benefits of smart cards are directly related to the volume of information and applications that are programmed for use on a card. A single contact/contactless smart card can be programmed with multiple banking credentials, medical entitlement, driver's license/public transport entitlement, loyalty programs and club memberships to name just a few. Multi-factor and proximity authentication can and has been embedded into smart cards to increase the security of all services on the card.

Contactless smart cards that do not require physical contact between card and reader are becoming increasingly popular for payment and ticketing applications such as mass transit and highway tolls. Such Near Field Communication (NFC) between a contactless smart card and a reader presents significant business opportunities when used in NFC-enabled mobile phones for applications such as payment, transport ticketing, loyalty, physical access control, and other exciting new services.

To support this fast evolving business environment, several entities including financial institutions, manufacturers of various NFC-enabled mobile phones and software developers, in addition to mobile network operators (MNO), become involved in the NFC mobile ecosystem. By nature of their individual roles, these players need to communicate with each other and exchange messages in a reliable and interoperable way.

One of the concerns in the NFC mobile ecosystem is its security in an open network. Thus there is a need to provide techniques to personalize a secure element in a contactless smart card or an NFC-enabled mobile device so that such a device is so secured and personalized when it comes to financial applications or secure transactions. With a personalized secure element in an NFC-enabled mobile device, various applications or services, such as electronic purse or payments, can be realized.

Generally speaking, the personalization of applications on a secure element requires the following steps to be performed:

1) Initial Secure Element (SE) keys are injected into the secure element.
2) An application is loaded into the secure element.
3) The application is personalized by loading credentials (e.g. keys) into the secure element.

Step 1 is typically done in a secure environment by a so-called Secure Element (SE) pre-personalizer or Operating System (OS) pre-personalizer. The SE keys injected in step 1 are usually die-individual in order to discourage potential attackers. This also adds complexity to the personalization process, mainly because of transmission of keys to the TSM.

Step 2 can be done in a secure environment by the SE pre-personalizer, or by a so-called Trusted Service Manager (TSM) in the field using the initial SE keys (or keys that were loaded into the SE using these initial SE Keys). A TSM provides a collection of services which help service providers to securely distribute and manage contactless services for their customers using the networks of mobile operators.

Step 3 is typically done by a TSM in the field using the initial SE Keys (or keys that were loaded into the SE using these initial SE Keys). The credentials are tied to a specific user. Thus, the credentials are linked to, or embed, personal data of said specific user. Services supporting the pre-provisioned SE are typically online transactions, for example payment transactions. In such transactions, the service provider needs to verify whether the link to a user has already been established.

Conventional methods for personalizing secure elements have the drawback that many steps and actors are involved. As a result of this complexity, personalizing applications on secure elements is an expensive process.

SUMMARY OF THE INVENTION

It is an object of the invention to reduce the complexity of methods for personalizing secure elements of the kind set forth.

This object is achieved by a method for personalizing a secure element as claimed in claim 1, a method for enabling a service as claimed in claim 3, a secure element as claimed in claim 5, and a computer program product as claimed in claim 7.

According to an aspect of the invention, a method for personalizing a secure element for a mobile device is conceived, wherein an application is stored in the secure element and wherein the application is pre-provisioned by loading secure credentials into the application without tying said secure credentials to a specific user of the secure element.

According to an embodiment of the invention, the secure credentials comprise a set of cryptographic keys.

According to another aspect of the invention, a method for enabling a service is conceived which comprises personalizing a secure element of the kind set forth, wherein, upon or after receipt of a request for subscription to a service corresponding to said application from a user, a provider of said service creates a link between the secure credentials and said user.

According to a further embodiment of the invention, creating the link between the secure credentials and the user comprises: receiving a device identifier from the secure element, comparing the received device identifier with a stored device identifier and corresponding stored secure credentials, and creating a link between the stored device identifier, the corresponding stored secure credentials and a unique identifier of said user.

According to a further aspect of the invention, a secure element is conceived which comprises an application having been pre-provisioned in accordance with a method for personalizing a secure element of the kind set forth.

According to a further aspect of the invention, a mobile device is conceived, in particular a smart phone or a web tablet, which comprises an application having been pre-provisioned in accordance with a method for personalizing a secure element of the kind set forth.

According to a further aspect of the invention, a computer program product is conceived which comprises instructions which, when being executed by a processing unit, carry out or control the steps of a method of personalizing a secure element of the kind set forth.

BRIEF DESCRIPTION OF THE DRAWINGS

The invention will be described in more detail with reference to the appended drawings, in which.

DESCRIPTION OF EMBODIMENTS

In accordance with the present disclosure, applications in secure elements are personalized before the secure elements are embedded into a mobile device. More specifically, secure elements are delivered with semi-personalized (i.e. pre-provisioned) applications, which means that secure credentials (e.g. cryptographic keys) have already been loaded into the applications, but they have not been tied to a specific user. When the user subscribes to the service, the credentials that were loaded may be linked to the user in the back-end. In this way, the service is ready to be deployed without expensive in-the-field provisioning. An additional advantage is that a Point-of-Sale (POS) recognizes a secure element as real as soon as it is put in the field. In other words, it is not necessary that the secure element undergoes a time-consuming provisioning process (e.g. performed by the TSM) in order to be recognized.

Figure 1:
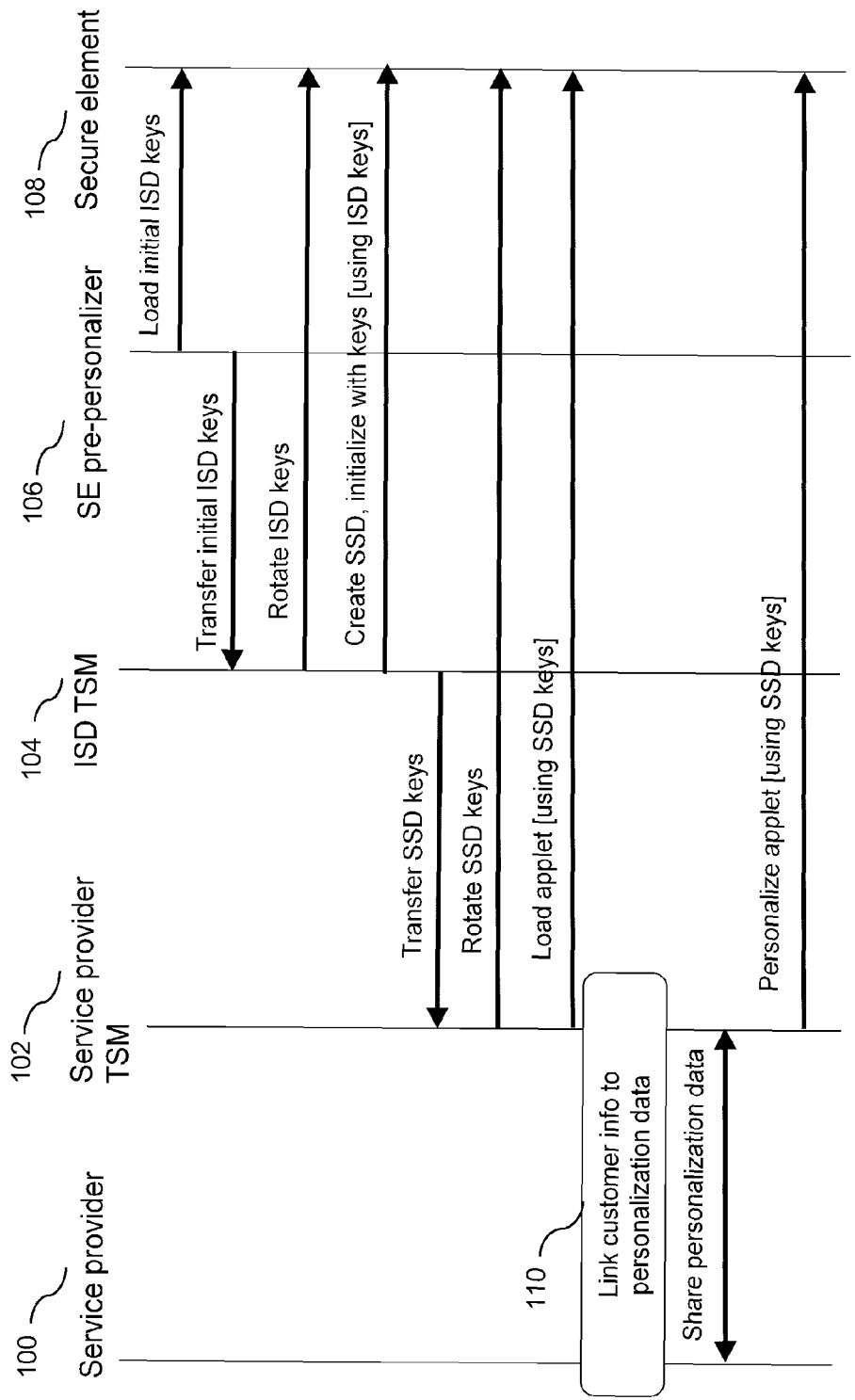
FIG. 1 illustrates a conventional data flow for personalizing a secure element.

FIG. 1 illustrates a conventional data flow for personalizing a secure element 108. First, an SE pre-personalizer 106 loads initial SE keys into the secure element. This is done in a secure environment. The initial SE keys comprise Issuer Security Domain (ISD) keys. The initial keys are also transferred to a corresponding TSM 104 for this security domain (ISD-TSM). Subsequently, the ISD keys are rotated and stored in the secure element. Also, a supplementary security domain may be created and initialized with SSD keys. The TSM transfers these SSD keys to a TSM 102 for this security domain (SP-TSM), which is acting on behalf of a service provider 100. The TSM 102 rotates the SSD keys and stores them in the secure element 108. Subsequently, an applet (i.e. an application) is loaded into the secure element 108 using the SSD keys. At this stage, customer information (e.g. a unique identifier of a user) is linked 110 to the personalization data (i.e. credentials) in a process involving both the service provider 100 and the TSM 102. Finally, the personalization data are shared between the service provider 100 and the TSM 102.

Figure 2:
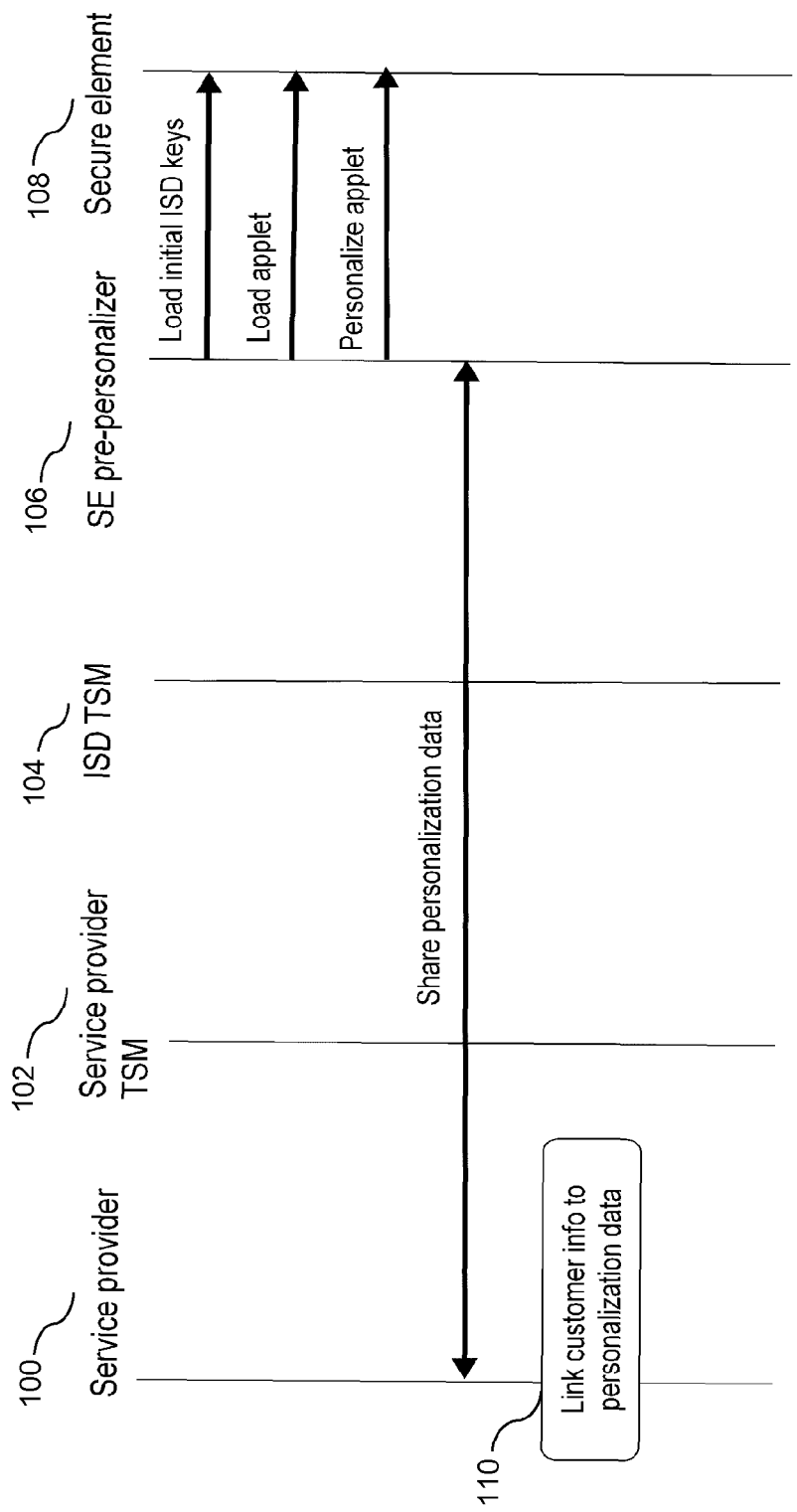
FIG. 2 illustrates a data flow for personalizing a secure element in accordance with an exemplary embodiment of the invention.

FIG. 2 illustrates a data flow for personalizing a secure element 108 in accordance with an exemplary embodiment of the invention. First, the SE pre-personalizer 106 loads initial ISD keys into the secure element. Subsequently, the applet (i.e. the application) is loaded into the secure element 108. At this stage, the application is also (semi-)personalized, i.e. secure credentials are loaded into the application without tying said secure credentials to a specific user of the secure element 108. Subsequently, the personalization data are shared between the SE pre-personalizer 106 and the service provider 100. Finally, customer information (e.g. a unique identifier of a user) is linked 110 to the personalization data (i.e. credentials) in a process which involves only the service provider 100.

Thus, the service provider 100 reads out a device identifier from the secure element 108 and has access to the secure credentials via another rout, for example via key delivery or a derivation from a secret. It should be noted that the term "service provider" used herein also refers to a party or person who acts on behalf of the party called "service provider" in a real system.

In practice, two links may be created:

A secure element will typically have a unique device identifier. Secure credentials are loaded and linked to this identifier, for example via a derivation or storing in a database. This can be done before the user subscribes to a service and without physical access to the secure element 108. The service provider receives, for example from the issuer of the secure element 108, both the device identifier of the secure element 108 and the corresponding secure credentials, and both may be stored in a storage unit by the service provider.

Upon service subscription, the device identifier and, as a consequence, also the corresponding secure credentials are linked to the user.

It is noted that the TSM does not participate at all in the exchange of data illustrated in FIG. 2. Thus, the complexity of the personalization is significantly reduced.

It will be appreciated that for service-provider specific applets, sharing the personalization data can also be done upfront, e.g. in the form of a master key from which the personalization data will be derived by the pre-personalizer (not shown).

The following use case scenario can be envisaged, for example:

A physical access service provider uses a certain applet.

The service provider shares a master key with the SE pre-personalizer.

The SE pre-personalizer pre-loads the applet into the secure elements.

In every secure element, the SE pre-personalizer loads credentials in the applet based on the shared master key and the SE identifier.

When the user wants to use the service, upon subscription the SE identifier is transferred to the service provider (e.g. by reading it out at a contactless reader).

The service provider links the SE identifier to the user in the back-end.

Using the master key, the service provider knows which credentials are present in the user's SE, and the service is usable.

It is noted that the invention can be used to advantage for both traditional secure elements, such as secure elements embedded in smart cards, and less traditional secure elements, such as so-called TEEs. In the latter case, the personalization may be done during phone production, for instance. Furthermore, although the section "Background" describes the specific context of NFC, it will be appreciated that the invention can be used to advantage in other contexts as well, for example for applications that deliver secure services, in particular authentication services, to websites.

Finally, it is noted that the drawings are schematic. In different drawings, similar or identical elements are provided with the same reference signs. Furthermore, it is noted that in an effort to provide a concise description of the exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS

100 Service Provider
102 Service Provider TSM
104 ISD TSM
106 SE pre-personalizer
108 Secure Element
110 Link customer info to personalization data

LIST OF ACRONYMS eSE embedded Secure Element
ISD Issuer Security Domain
SE Secure Element
SSD Supplementary Security Domain
OS Operating System
POS Point-of-Sale
SIM Subscriber Identity Module
TEE Trusted Execution Environment
TSM Trusted Service Manager

The invention claimed is:

1. A method for enabling a personalized service comprising:
   storing, in a secure element, an application, wherein the secure element is a non-transitory computer-readable medium;
   loading, in the secure element, secure credentials into the application, wherein the secure credentials are not tied to any user of the secure element;
   receiving, in the secure element, a request for a subscription to a service corresponding to the application from a specific user; and
   creating, in the secure element, a link between the secure credentials in the secure element and the specific user after receiving the request for the subscription from the specific user.

2. The method as claimed in claim 1, wherein the secure credentials comprise a set of cryptographic keys.

3. The method as claimed in claim 1, wherein creating the link between the secure credentials and the specific user comprises:
   receiving a device identifier from the secure element;
   comparing the received device identifier with a stored device identifier and corresponding stored secure credentials; and
   creating a link between the stored device identifier, the corresponding stored secure credentials, and a unique identifier of said specific user.

4. A secure element, implemented as a non-transitory computer-readable medium, that is configured to store an application, load secure credentials into the application, wherein the secure credentials are not tied to any user of the secure element, receive a request for a subscription to a service corresponding to the application from a specific user; and create a link between the secure credentials in the secure element and the specific user after receiving the request for the subscription from the specific user.

5. The secure element as claimed in claim 4, wherein the secure element is located within a mobile device.

6. A non-transitory computer-readable medium comprising instructions which, when being executed by a processing unit, carry out or control a personalized service, the instructions comprising:
   instructions for storing an application;
   instructions for loading secure credentials into the application, wherein the secure credentials are not tied to any user;
   instructions for receiving a request for a subscription to a service corresponding to the application from a specific user; and instructions for creating a link between the secure credentials in the secure element and the specific user after receiving the request for the subscription from the specific user.

7. The secure element of claim 5, wherein the mobile device is a smart phone.

8. The secure element of claim 5, wherein the mobile device is a web tablet.

* * * * *